United States Patent

Ott

[11] Patent Number: 5,824,146
[45] Date of Patent: Oct. 20, 1998

[54] METHOD FOR MAKING A PHOTODURABLE AQUEOUS TITANIUM DIOXIDE PIGMENT SLURRY USING A HIGH LEVEL OF ALUMINUM CO-OXIDANT

[75] Inventor: Michael Warren Ott, Newark, Del.

[73] Assignee: E. I. du Pont de Nemours and Company, Wilmington, Del.

[21] Appl. No.: 888,083

[22] Filed: Jul. 3, 1997

[51] Int. Cl.[6] ................................... C09C 1/36
[52] U.S. Cl. .................. 106/442; 106/436; 106/437; 106/443; 106/445
[58] Field of Search .................. 106/442, 443, 106/445, 436, 437

[56] References Cited

U.S. PATENT DOCUMENTS

| | | | |
|---|---|---|---|
| 2,488,439 | 11/1949 | Schaumann | 23/202 |
| 2,559,638 | 7/1951 | Krchma | 23/202 |
| 3,036,926 | 5/1962 | Hughes | 106/442 |
| 3,340,008 | 9/1967 | Nelson et al. | 106/442 |
| 3,524,818 | 8/1970 | Bramekamp et al. | 106/442 |
| 3,547,671 | 12/1970 | Hitzemann | 106/438 |
| 3,640,744 | 2/1972 | Dietz et al. | 106/438 |
| 3,650,793 | 3/1972 | Goodspeed et al. | 106/443 |
| 4,083,946 | 4/1978 | Schurr et al. | 423/613 |
| 4,214,913 | 7/1980 | Glaeser | 106/437 |
| 5,356,470 | 10/1994 | Ott et al. | 106/437 |

FOREIGN PATENT DOCUMENTS 686570  1/1953  United Kingdom .

OTHER PUBLICATIONS

J.N.Patel, Artificial Weathering of Paints, *JOCCA*, pp. 104–106, (1991).

*Primary Examiner*—Mark L. Bell
*Assistant Examiner*—Scott L. Hertzog

[57] ABSTRACT

This invention relates to a new method for making a photodurable, aqueous titanium dioxide ($TiO_2$) pigment slurry. This method involves reacting titanium tetrachloride, aluminum chloride and an oxygen-containing gas in the presence of a nucleant in the vapor phase to produce $TiO_2$ pigment. A sufficient amount of aluminum chloride is added to provide at least 2 wt. % alumina in the $TiO_2$ pigment. The $TiO_2$ pigment is separated from the reaction gases; and mixed with sufficient water to produce a $TiO_2$ slurry comprising at least 78 wt. % $TiO_2$ solids. The slurry may be used in coating formulations such as paints.

12 Claims, 1 Drawing Sheet

METHOD FOR MAKING A PHOTODURABLE AQUEOUS TITANIUM DIOXIDE PIGMENT SLURRY USING A HIGH LEVEL OF ALUMINUM CO-OXIDANT

BACKGROUND OF THE INVENTION

1. Field of the Invention

This invention relates to a new method for making a photodurable, aqueous titanium dioxide ($TiO_2$) pigment slurry, where a high level of aluminum co-oxidant is used to make the $TiO_2$ pigment. The resulting photodurable, aqueous $TiO_2$ pigment slurry is particularly useful for incorporating into coating formulations such as paints.

2. Description of the Related Art

In the "chloride" process for production of titanium dioxide ($TiO_2$) pigment, titanium tetrachloride ($TiCl_4$) is oxidized in the vapor phase with an oxygen-containing gas, typically in the presence of aluminum chloride ($AlCl_3$), to produce a hot gaseous suspension of $TiO_2$ solid particulate. This crude $TiO_2$ particulate is then subjected to certain finishing and grinding treatments depending on which type of final $TiO_2$ pigment product is desired.

Generally, the finishing and grinding treatment involves the steps of: (a) dispersing the crude $TiO_2$ particles in an aqueous medium to form a slurry having a low $TiO_2$ solids concentration; (b) precipitating an inorganic oxide coating, (e.g., alumina, and/or silica) onto the surfaces of the $TiO_2$ particles; (c) recovering the inorganic oxide surface-treated $TiO_2$ particles from the aqueous medium by filtering; (d) washing the $TiO_2$ particles to remove by-product salts and impurities therefrom; (e) drying the washed $TiO_2$ pigment particles; (f) dry-grinding the dried $TiO_2$ pigment particles to a desired particle size using a fluid-energy mill, and optionally, if an aqueous $TiO_2$ pigment slurry is desired, (g) dispersing the pigment product in water to produce a slurry typically having a $TiO_2$ solids content of 72 to 78 wt. %.

The resultant aqueous $TiO_2$ pigment slurry may be used in many end-use applications such as in the manufacture of coatings (e.g., paints). The $TiO_2$ pigment efficiently scatters visible light, thereby imparting whiteness, brightness, and opacity when incorporated into coating formulations. Since many coatings containing $TiO_2$ pigment are exposed to severe weather conditions, it is important that the $TiO_2$ pigment be photodurable in order to provide these coatings with good resistance to chalking and discoloration. Particularly, many paints contain organic binders which are susceptible to photochemical attack and degrade over time on exposure to sunlight, moisture, temperature change, and other conditions to form oxygenated species that solubilize and wash away from the surface of the paint. Chalking occurs as increased amounts of organic binder are removed from the paint's surface, causing $TiO_2$ and extender pigments to protrude through the paint's surface and producing a white, chalky appearance. By itself, the surface of the $TiO_2$ pigment particle is photochemically active and can promote degradation of the organic binders under certain conditions. However, this form of degradation can be controlled by the application of inorganic oxide coatings (e.g., alumina and/or silica) onto the surfaces of the $TiO_2$ particles. The inorganic oxide surface treatment forms a barrier between the surfaces of the $TiO_2$ particles and the organic binders.

Co-pending, co-assigned U.S. Patent Application entitled "A Method For Making a Photodurable Aqueous Titanium Dioxide Pigment Slurry" (CH-2323—Filing Date: May 14, 1997—Ser. No. 08/856,062) discloses a method for making a photodurable, aqueous $TiO_2$ pigment slurry. This method involves the steps of mixing amorphous alumina, $TiO_2$ pigment particles, water, and at least one dispersant to form the slurry. The amount of alumina used is at least about 3 wt. % based on the total weight of $TiO_2$ solids in the slurry. The resulting slurry can be diluted to a lower $TiO_2$ solids content, and the slurry can then be screened and media-milled. The slurry is described as being particularly useful in coating formulations such as paints.

Ott and Sullivan, U.S. Pat. No. 5,356,470 discloses a process for making an aqueous $TiO_2$ pigment slurry, wherein the amount of oversized $TiO_2$ particles having a particle size greater than 1 micron are reduced in the slurry. The process involves making an aqueous slurry having about 79 to 83% by weight $TiO_2$ solids. The $TiO_2$ particles are produced by oxidizing a mixture of $TiCl_4$ and $AlCl_3$ with oxygen, with the amount of $AlCl_3$ used being sufficient to form 0.1 to 1.5% $Al_2O_3$ in the $TiO_2$. The slurry is viscous shear-processed, diluted, and then media-milled to reduce the size of the $TiO_2$ particles. The resulting $TiO_2$ slurry is described as being particularly suitable for coating paper products, but the slurry does not have good photodurability, since there is no wet-treatment of the $TiO_2$ particles with an alumina or silica coating.

British Patent 686,570 describes a process to prepare titanium dioxide containing at least 90% rutile, whereby the decomposition of titanium tetrachloride is performed in the presence of a volatile aluminum compound which is converted to alumina under process conditions. The amount of aluminum compound is such to obtain 0.01–10%, preferably 0.5–2% by weight of alumina in the titanium dioxide.

Krchma, U.S. Pat. No. 2,559,638 describes a process to prepare $TiO_2$ pigment, wherein aluminum chloride is added as a co-oxidant during vapor phase oxidation of titanium tetrachloride. The amount of aluminum chloride added is sufficient to provide 0.1–10% by weight alumina, and preferably 0.3–3%, based on the $TiO_2$ being produced. Water vapor is also present in the oxidation medium at 0.05–10%, preferably 0.1–3%.

Hitzemann et al., U.S. Pat. No. 3,547,671 discloses a process to prepare rutile $TiO_2$ pigment, wherein oxidation of $TiCl_4$ takes place in the presence of $AlCl_3$ and a phosphorus chloride. Subsequently, the pigment is subjected to wet-treatment with aluminum and silicon salts to precipitate alumina and silica coatings, respectively. The amounts of $AlCl_3$ and phosphorus chloride added achieve preferably 2–4% by weight alumina and 0.5–3% $P_2O_5$ by weight in the pigment base.

In Dietz, U.S. Patent 3,640,744 and Goodspeed, U.S. Pat. No. 3,650,793, a process to prepare $TiO_2$ by vapor phase oxidation of a titanium halide is disclosed, wherein aluminum and silicon compounds are added to the oxidation step such that 1–2.5 wt. % alumina and 0.3–0.75 wt. % silica are provided in the final $TiO_2$ product.

Glaeser, U.S. Pat. No. 4,214,913 discloses a process to prepare rutile $TiO_2$ by vapor phase oxidation of a mixture of $TiCl_4$ and $AlCl_3$ and after at least 80% of the $TiCl_4$ has been converted to $TiO_2$, adding $PCl_3$ to form $P_2O_5$. $AlCl_3$ is present to provide 0.1–1.5% $Al_2O_3$ in the $TiO_2$. Sufficient $PCl_3$ is added to provide 0.1–0.5% $P_2O_5$ in the $TiO_2$.

As described in the above references, it is known to add volatile aluminum compounds in the oxidation reaction of titanium tetrachloride ($TiCl_4$), primarily to increase the rutile content of the $TiO_2$ pigment being produced. Typically, the amount of aluminum compound added is sufficient to form 1 to 1.5 wt. % alumina based on the $TiO_2$ pigment product, and this amount helps achieve greater than 99% rutile in the pigment product.

However, for some end-use applications, these TiO₂ pigments may not have sufficient photodurability; thus, the pigment is often wet-treated. In a wet-treatment process, metal oxide coatings, preferably silica and alumina, are applied to the surface of the TiO₂ particles to enhance the photodurability of the pigment. While wet-treatment processes provide high photodurability, they involve a number of steps, including filtration, drying, coating steps, refiltration, etc. which add substantial cost to the overall process.

Further, as also described above, the TiO₂ pigment must then usually be formulated into a slurry in order to make it suitable for coating applications. Conventional processes used to prepare a TiO₂ pigment slurry involve several energy-intensive steps and the processing equipment requires high capital investment.

In view of the forgoing, it would be desirable to have a direct slurry-manufacturing process, where the steps of wet-treatment, filtering, washing, drying, grinding, and reslurrying the TiO₂ particles could be eliminated.

The present invention provides a new method for making a photodurable, aqueous TiO₂ pigment slurry having significantly improved photodurability. In the direct slurry manufacturing method of this invention, the cost-intensive and conventional processing steps of wet-treatment, filtration, drying, and grinding are eliminated. Particularly, in this method, the alumina content of the TiO₂ pigment is at least 2 wt. % after the oxidation reaction. At this higher level of alumina, an enhancement in photodurability of the TiO₂ pigment is achieved so that this pigment can be directly incorporated into a slurry without first being subjected to a conventional wet-treatment process. The resulting photodurable, aqueous TiO₂ pigment slurry can be used in coating formulations such as paints.

SUMMARY OF THE INVENTION

The present invention provides a method for preparing a photodurable, aqueous TiO₂ slurry comprising the steps of:

(a) reacting titanium tetrachloride, aluminum chloride and an oxygen-containing gas in the presence of a nucleant in the vapor phase to produce TiO₂ pigment, wherein sufficient aluminum chloride is added to provide at least 2 wt. % alumina in the TiO₂ pigment based on total weight of TiO₂ solids;

(b) separating the TiO₂ pigment from the reaction gases; and (c) mixing the TiO₂ pigment with sufficient water to produce a TiO₂ slurry comprising at least 78 wt. % TiO₂ solids, based on total slurry weight.

Preferably, the alumina content is at least 3 wt. % and more preferably about 3 to about 5 wt. %. Also, the slurry preferably contains about 80 to about 88 wt. % TiO₂ solids. The reaction of titanium tetrachloride, aluminum chloride and oxygen-containing gas may occur in the presence of a phosphorus chloride to provide 0.1 to 0.5 wt. % P₂O₅ in the TiO₂ pigment.

The TiO₂ pigment can optionally undergo injector-treatment, wherein the pigment is treated with a gas selected from the group consisting of steam, air, nitrogen, and mixtures thereof, at a sonic or supersonic velocity, a pressure of about 25–600 psi, and a temperature of 140°–650° C. subsequent to step (b) and prior to step (c) as described above. The treated TiO₂ pigment may then be separated from the gasses which were used to treat the pigment.

In preparing the slurry, the TiO₂ pigment is preferably mixed with water in the presence of a dispersant. Preferred dispersants include those selected from the group consisting of citric acid, polyacrylates, triethanolamine, 2-amino-2-methyl-1-propanol, monoisopropylamine, and mixtures thereof.

The slurry produced by the above method can subsequently be diluted. Preferably, the slurry is diluted to a TiO₂ solids content in the range of about 68 to about 78 wt. % based on total slurry weight. Optionally, the slurry can then be screened to remove grit and media-milled to reduce particle size and enhance pigmentary properties.

DETAILED DESCRIPTION OF THE INVENTION

Figure 1:
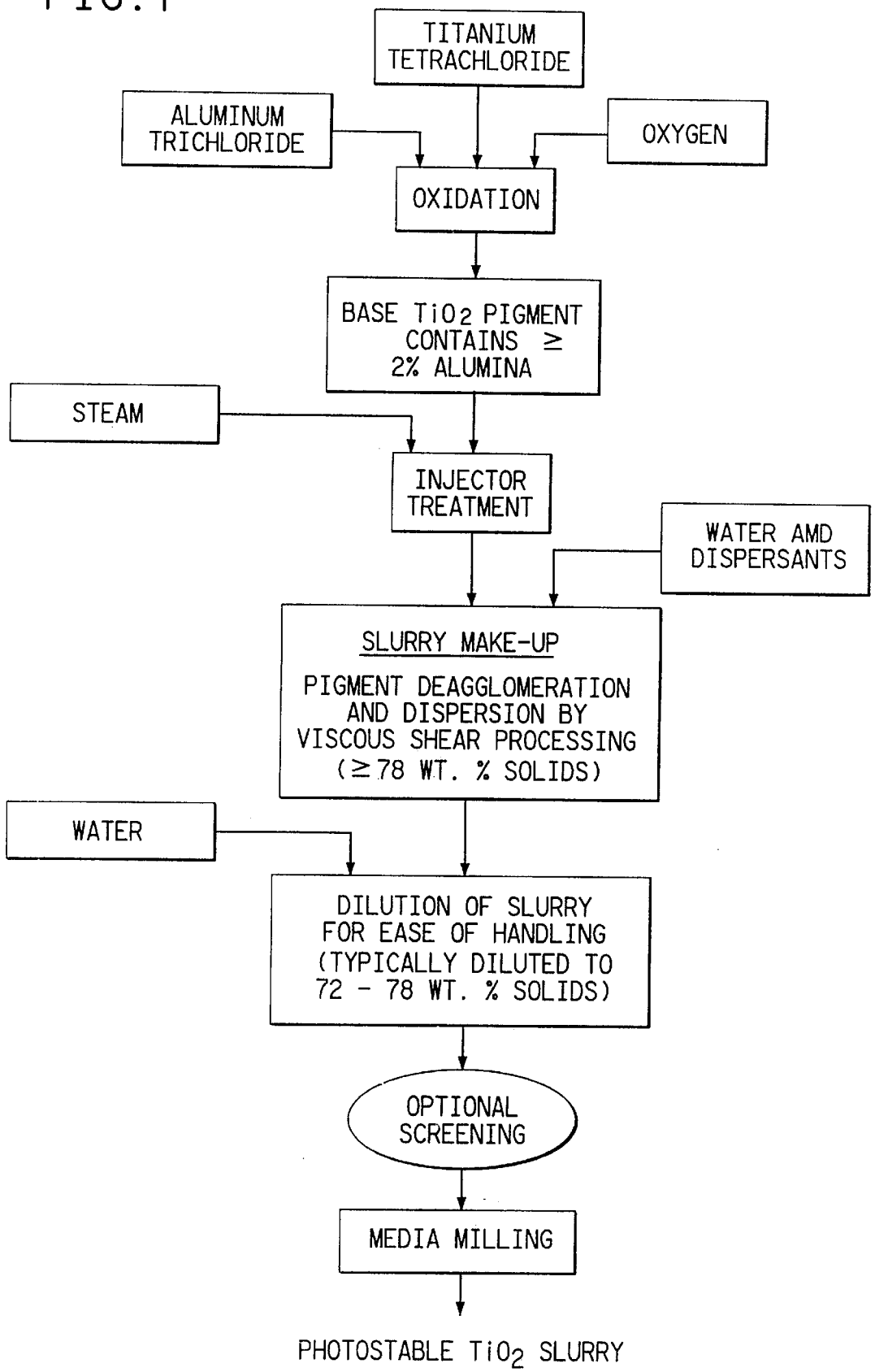
FIG. 1 shows a schematic diagram for a preferred embodiment of making the photodurable, aqueous TiO₂ slurry of this invention.

The present invention provides a process for preparing an aqueous titanium dioxide pigment slurry, wherein the pigment contains at least 2 wt. % alumina, based on the total pigment weight. This TiO₂ slurry has high photodurability, for example, when incorporated into coating formulations.

The production of TiO₂ by vapor phase oxidation of TiCl₄, i.e., "the chloride process", is well known and disclosed in Schaumann, U.S. Pat. No. 2,488,439, the disclosure of which is hereby incorporated by reference. In the chloride process, TiCl₄ is reacted with an oxygen-containing gas in the vapor phase in a reactor at a temperature of about 900° to 1600° C. to produce a hot gaseous suspension of TiO₂ solid particulate and free chlorine.

Particularly in the method of the present invention, TiCl₄ is evaporated and preheated to temperatures from about 300° to 650° C. and introduced into the reaction zone of a reactor. A volatile aluminum compound, such as aluminum halides, including AlCl₃, AlBr₃, and AlI₃, preferably AlCl₃, is added to the reaction zone. Typically, the aluminum compound is thoroughly premixed with the TiCl₄ prior to its introduction into the reaction zone. In alternative embodiments, the aluminum compound can be added partially or completely downstream from the point of where the TiCl₄ and oxygen-containing gas are initially contacted.

The aluminum compound added becomes incorporated as alumina and/or an alumina mixture in the TiO₂, meaning the alumina and/or alumina mixture is dispersed in the TiO₂ particles and/or on the surface of the TiO₂ particles as a surface coating. The amount of aluminum compound added is sufficient to provide at least 2 wt. %, and preferably about 2.5 to about 6 wt. %, and more preferably about 3 to about 5 wt. % Al₂O₃ based on the total TiO₂ solids formed in the oxidation reaction. Levels of aluminum compound added, measured as amount of alumina, greater than 2 wt. % provide enhanced durability for the TiO₂ product and subsequent TiO₂ slurry prepared according to this invention.

Other co-oxidants and rutile promoters may be added at the point of addition of the aluminum compound or further downstream in the process. For example, PCl₃ may be added at one or more points downstream from where the TiCl₄ and oxygen-containing gas are initially contacted as described in Glaeser, U.S. Pat. No. 4,214,913, the disclosure of which is hereby incorporated by reference. The phosphorous compound becomes incorporated on the surface of the TiO₂ particles as phosphorus oxide (P₂O₅). In the present invention, it can be advantageous for the TiO₂ pigment to contain about 0.1 to about 0.5 wt. % P₂O₅, since the P₂O₅ improves the deagglomeration of the base TiO₂ pigment.

The oxygen-containing gas is preheated to at least 1200° C. and is continuously introduced into the reaction zone through a separate inlet from an inlet for the $TiCl_4$ feed stream. By "reaction zone", it is meant the length of the reactor in which substantial reaction of the reactants takes place. The reaction of $O_2$ and $TiCl_4$ in the vapor phase is extremely fast and provides a hot gaseous suspension comprising $TiO_2$ particles and free chlorine. This reaction step is followed by a brief period of $TiO_2$ particle growth.

The oxygen containing gas which is introduced into the reaction zone contains a nucleant. By "nucleant", it is meant any substance which can reduce the particle size of the pigment such as metals, oxides, salts, or other compounds of sodium, potassium, lithium, rubidium, cesium, calcium, barium, strontium, or mixtures thereof. The salts, CsCl and KCl, are preferred for use in this invention.

The hot gaseous suspension of $TiO_2$ solid particulate is then rapidly cooled in order to prevent undesirable particle size growth. Cooling of the hot gaseous suspension may be performed by methods known in the art. These methods typically involve passing the hot gaseous suspension through a cooling conduit (flue) having relatively cool walls in comparison to the gaseous suspension. Granular scouring particles (scrubs), such as calcined $TiO_2$, sand, and mixtures thereof may be added to the flue to reduce the formation of $TiO_2$ particulate deposits on the internal walls of the flue.

The $TiO_2$ pigment can be recovered from the cooled reaction products by conventional separation treatments, including cyclonic or electrostatic separating media, filtration through porous media, or the like. The recovered $TiO_2$ pigment contains residual chlorides, but this pigment may be used after the particles have been treated to remove the residual chlorides.

In a preferred embodiment to remove these residual chlorides, the $TiO_2$ pigment undergoes injector-treatment (IT) as described in Schurr, U.S. Pat. No. 4,083,496, the disclosure of which is hereby incorporated by reference. This treatment involves treating the $TiO_2$ pigment with a gas selected from the group consisting of steam, air, nitrogen, and mixtures thereof, at a sonic or supersonic velocity, a pressure of about 25–600 psi and a temperature of 140°–650° C., followed by separating the pigment from the gas. The $TiO_2$ pigment can be separated from the gas and chloride impurities by using any suitable separating devices such as a cyclone or a bag filter. Injector-treatment reduces the $TiO_2$ pigment acidity/chlorides which can reduce the amount of dispersant needed for pH control of a product slurry. Prior to injector-treatment, there can be steps to grind or mill the pigment. By partial deagglomeration of the pigment, injector-treated pigment can be processed at an increased solids content during the dispersion step. Injector-treatment provides the advantages of improved durability, low chlorides and improved slurry processability.

The chloride-free base $TiO_2$ pigment is then used for direct aqueous slurry processing. The $TiO_2$ pigment is mixed with water in the presence of a dispersant to provide a $TiO_2$ slurry. Commercially-available dispersants can be used to prepare the aqueous $TiO_2$ pigment slurry of this invention. These dispersants include, for example, sodium or potassium pyrophosphate; sodium hexametaphosphate; sodium, potassium, or ammonium polyphosphate; aliphatic carboxylic acid; citric acid; polyhydroxy alcohols; polyacrylates and the like; and alcohol amines such as 1-amino-2-ethanol; 2-amino-1-ethanol, 1-amino-2-propanol, 2-amino-2-methyl-1-propanol, diethanolamine, di-isopropanolamine, 2-methylamino-1-ethanol, monoisopropanolamine, triethanolamine, and the like, and mixtures thereof. The pH of the slurry is preferably adjusted to a level in the range of about 6.0 to about 9.0 by the addition of these dispersants to the slurry.

The mixing of the $TiO_2$ pigment particles, dispersant, and water is best done at greater than 78% $TiO_2$ solids where viscous sheer conditions can produce deagglomeration of the $TiO_2$ particle agglomerates. The mixing process can be carried out continuously or batchwise.

In a batch process, the $TiO_2$ pigment is mixed with water and stirred under high shear conditions using a high speed mixer. The pH of the slurry may need to be adjusted to about 6.0 to 9.0 by adding at least one dispersant to the slurry. As the $TiO_2$ solids content is increased, the viscosity of the slurry increases. It is important that the $TiO_2$ particles be sufficiently dispersed and incorporated into the slurry. Under high shear conditions at a high solids content, the $TiO_2$ particle agglomerates are broken-up by the high shear stress zones resulting in improved dispersion of the $TiO_2$ particles into the slurry. With such processing conditions, the incorporation of the $TiO_2$ particles into the slurry is improved by increasing the mixing speed of the mixer.

In a continuous process, the $TiO_2$ pigment is continuously and simultaneously added to a tank along with water and a dispersant, such that the tank is always maintained at the required $TiO_2$ solids content for good high shear processing. Simultaneously, with the addition of new material, a portion of the processed aqueous $TiO_2$ slurry can be removed by any suitable means, typically from the bottom of the tank by gravity flow or a conveying screw.

The water content of the slurry is dependent on the desired viscosity and $TiO_2$ solids content of the slurry. However, it is important that the initial $TiO_2$ solids content be at least 78 wt. % based on total weight of the slurry in order that high shear stress zones may be created during the viscous shear processing of the slurry. The $TiO_2$ particle agglomerates are broken-up by the high shear stress zones resulting in improved dispersion of the $TiO_2$ particles into the slurry. Generally, the initial $TiO_2$ solids content of the slurry is at least 78 wt. % and is preferably in the range of about 80 to about 88 wt. %, more preferably in the range of about 83 to about 86 wt. %.

The slurry may then be diluted to a desired $TiO_2$ solids content to provide an aqueous slurry which can be more easily handled and transported to other sites such as a paint manufacturing facility. For example, in many applications, it is desirable that the slurry be diluted to a final $TiO_2$ solids content of less than about 80 wt. %, preferably about 68 to about 78 wt. %, and more preferably about 72 to about 78 wt. %. This resulting aqueous slurry has Theological properties similar to those of conventional slurries made by mixing micronized $TiO_2$ pigment particles with water.

The slurry may then be subjected to a screening process to remove any grit, and the screened slurry may be media-milled to reduce the size of the $TiO_2$ particles by techniques known in the art such as those described in Ott et al., U.S. Pat. No. 5,356,470. These screening and media-milling steps do not affect the photodurability of the pigment, but they may improve Theological and end-use properties such as the gloss of paints containing these pigments.

In summary, the method of this invention involves the following steps, some of which are optional. The overall method steps are also illustrated in FIG. 1:

(a) reacting titanium tetrachloride, aluminum chloride and an oxygen-containing gas in the presence of a nucleant in the vapor phase to produce $TiO_2$ pigment, wherein sufficient aluminum chloride is added to provide at least 2% by weight alumina in the TiO$_2$ pigment;

(b) separating the TiO$_2$ pigment from the reaction gases;

(c) optionally treating the TiO$_2$ pigment with a gas selected from the group consisting of steam, air, nitrogen, and mixtures thereof, at a sonic or supersonic velocity, a pressure of about 25–600 psi, and a temperature of 140°–650° C.;

(d) separating the treated pigment from the gases;

(e) mixing the TiO$_2$ pigment with sufficient water, optionally in the presence of a dispersant, to prepare a TiO2 slurry comprising at least 78 wt. % solids, based on total slurry weight;

(f) optionally diluting the slurry; and (g) optionally screening and media-milling the slurry to reduce the size of the TiO$_2$ particles.

Test Methods

Chalk/Fade (C/F)

The method used for measuring the chalk/fade degradation of paints containing TiO$_2$ pigment from the following examples is discussed by W. H. Daiger and W. H. Madson in "Journal of Paint Technology," 1967, vol. 39, no. 510, pp. 399–410.

The basis of this test is that white objects (including TiO$_2$ particles) scatter all wavelengths of visible light equally. A paint is prepared with the desired pigment and then tinted blue with a copper phthalocyanine pigment. Panels coated with these paints are exposed in Florida for a specified period of time. The reflectance of red light from the panel is measured using a calorimeter. Since the fresh panels are blue (i. e., reflect all colors but red), red reflectance values are initially very low. The red reflectance increases as pigment particles are exposed and scatter all wavelengths of visible light equally.

Since the absolute rate of chalking depends on a number of variables, standards are used and sample results should be considered as relative to the standards.

Viscosity

In the following examples, slurry viscosity data are based on Brookfield viscosity measurements made on slurries at 25° C., and 100 rpm, using a number 4 spindle for values up to 2000 centipoise (cp) and an appropriate spindle for higher viscosities.

Rheology

In the examples, slurry rheology data are obtained by measurements with a Hercules high shear device, operating at a shear rate of 2000 reciprocal seconds. The Hercules rheometer, made by Kaltec Scientific, Novi, Mich., has a rotating bob inside a cup filled with the slurry which transmits shear forces and deflects the spring. Results are reported in centipoise (cp) units.

EXAMPLES

Comparative Example 1

Base pigment was made as follows. A stream of oxygen preheated to 1550° C. was introduced into one end of a tubular reactor. About 15 ppm of KCl was added to the oxygen stream to control particle size. Titanium tetrachloride vapor stream containing aluminum trichloride to provide about 1% Al$_2$O$_3$ was introduced into the reactor at 450° to 500° C. The AlCl$_3$ was produced by reacting aluminum with Cl$_2$ in the presence of the TiCl$_4$ stream, as it was beneficial to use this exothermic reaction to heat the TiCl$_4$ stream to 450° C. or higher. PCl$_3$ in a vapor phase was added subsequently to produce about 0.3% P$_2$O$_5$ on a pigment basis. Scrub solids were added to the reaction stream before it exited the reactor into cooling flues. The pigment was cooled to less than 160° C., and separated from by-product Cl$_2$. This base pigment was used to make a slurry.

Surfactant premix was prepared by mixing 50 g of water, 2.0 g of 50% citric acid solution, and 5.4 g of amino-methyl-propanol (AMP). About 138 g of water were added to a vessel with agitation provided by an IKA mixer. Base pigment, as prepared above, (1000 g) was added along with the surfactant premix to the vessel over a period of about 8 minutes. The addition rate was slowed as slurry solids and viscosity increased, resulting in 83.8% TiO$_2$ solids at about pH 8.6. Agitation was continued for 5 minutes to obtain a uniform deagglomerated slurry. Then, 112 g of water were added to dilute the slurry to about 76% TiO$_2$ solids. The properties for the resultant slurry are shown below in Table 1.

Comparative Example 2

For this example, the base TiO$_2$ pigment of Comparative Example 1 was first subjected to Injector-Treatment (IT) with 450° C. steam (as described in U.S. Pat. No. 4,083, 946). The IT reduced the base pigment acidity/chlorides, which reduced the amount of alcohol amine needed for pH control. By giving partial deagglomeration of the base pigment, IT processed pigment can be processed at increased percent solids during the dispersion step.

This injector-treated base TiO$_2$ pigment was used to make a slurry following a similar procedure as described in Comparative Example 1. Surfactant premix was prepared by mixing 50 g of water, 2.0 g of 50% citric acid solution, and 2.1 g of AMP. About 110 g of water were added to a vessel with agitation provided by an IKA mixer. 1000 g of injector-treated base pigment were added along with surfactant premix to the vessel over about 5 minutes. The addition rate was slowed as slurry solids and viscosity increased, resulting in 86.2% TiO$_2$ solids at about pH 8.8. Agitation was continued for 5 minutes to obtain a uniform deagglomerated slurry. Then, 137 g of water were added to dilute the slurry to about 76% TiO$_2$ solids. The properties for the resultant slurry are shown below in Table 1.

Example 3

The base pigment produced under identical conditions from Comparative Example 1, except that the amount of aluminum trichloride was increased to give pigment with about 3.0% Al$_2$O$_3$. This pigment was used to make the slurry. Pre-mixed surfactant was separately prepared, consisting of 50 g of water, 2.0 g of 50% citric acid solution, 5.5 g of AMP. About 138 g of water were added to a vessel with agitation provided by an IKA mixer. 1000 g of the base pigment were added along with surfactant premix to the vessel over about 8 minutes. The addition rate was slowed as slurry solids and viscosity increased, resulting in 83.8% TiO$_2$ solids at about pH 8.6. Agitation was continued for 5 minutes to obtain a uniform deagglomerated slurry. Then, 112 g of water were added to dilute the slurry to about 76% TiO$_2$ solids. The properties for the resultant slurry are shown below in Table 1.

Example 4

The base TiO$_2$ pigment from Example 3 was subjected to the same injector-treatment of Comparative Example 2 and was used to make a slurry. Surfactant premix was prepared by mixing 50 g of water, 2.0 g of 50% citric acid solution, and 2.8 g of AMP. About 110 g of water were added to a vessel with agitation provided by an IKA mixer. 1000 g of injector-treated base pigment were added along with surfactant premix to the vessel over about 5 minutes. The addition rate was slowed as slurry solids and viscosity increased, resulting in 86.1% $TiO_2$ solids at about pH 8.6. Agitation was continued for 5 minutes to obtain a uniform deagglomerated slurry. Then, 137 g of water were added to dilute the slurry to about 76% $TiO_2$ solids. The properties for the resultant slurry are shown below in Table 1.

Example 5

A base $TiO_2$ pigment was produced by the same process as that of Comparative Example 1, except the amount of aluminum trichloride was increased to give pigment with about 3.0% $Al_2O_3$, and no $P_2O_5$ co-ox was used. This pigment was used to make the slurry. Surfactant pre-mix was prepared by mixing 50 g of water, 2.0 g of 50% citric acid solution, and 5.5 g of AMP. About 138 g of water were added to a vessel with agitation provided by an IKA mixer. 1000 g of the base pigment were added along with surfactant premix to the vessel over about 8 minutes. The addition rate was slowed as slurry solids and viscosity increased, resulting in 83.7% $TiO_2$ solids at about pH 8.6. Agitation was continued for 5 minutes to obtain a uniform deagglomerated slurry. Then, 112 g of water were added to dilute the slurry to about 76% $TiO_2$ solids. The properties for the resultant slurry are shown below in Table 1.

Example 6

The base $TiO_2$ pigment of Example 5 was subjected to the injector-treatment process of Comparative Examples 2 and 4 and used to make a slurry. Surfactant premix was prepared by mixing 50 g of water, 2.0 g of 50% citric acid solution, and 2.6 g of AMP. About 110 g of water were added to a vessel with agitation provided by an IKA mixer. 1000 g of injector-treated base pigment were added along with surfactant premix to the vessel in about 5 minutes. The addition rate was slowed as slurry solids and viscosity increased, resulting in 86.1% $TiO_2$ solids at about pH 9.0. Agitation was continued for 5 minutes to obtain a uniform deagglomerated slurry. Then, 137 g of water were added to dilute the slurry to about 76% $TiO_2$ solids. The properties for the resultant slurry are shown below in Table 1.

TEST RESULTS

| Example | C/F | Brookfield Viscosity | Rheology in cp |
| --- | --- | --- | --- |
| 1 (Comparative) | 2 | 900 | 7 |
| 2 (Comparative) | 9 | 230 | 3 |
| 3 | 10 | 740 | 7 |
| 4 | 14 | 200 | 3 |
| 5 | 12 | 760 | 4 |
| 6 | 16 | 200 | 3 |

These results demonstrate the improvement in photodurability when about 3% $Al_2O_3$ co-ox was used and an even larger improvement when this base $TiO_2$ pigment was used in conjunction with injector-treatment.

I claim:

1. A method for making a photodurable, aqueous titanium dioxide pigment slurry, comprising the steps of:
   (a) reacting titanium tetrachloride, aluminum chloride and an oxygen-containing gas in the presence of a nucleant in the vapor phase to produce $TiO_2$ pigment, wherein sufficient aluminum chloride is added to provide at least 2 wt. % alumina in the $TiO_2$ pigment based on total weight of $TiO_2$ solids;
   (b) separating the $TiO_2$ pigment from the reaction gases; and
   (c) mixing the $TiO_2$ pigment with sufficient water to produce a $TiO_2$ slurry comprising at least 78 wt. % $TiO_2$ solids, based on total slurry weight.

2. The method of claim 1, wherein about 3 to about 5 wt. % alumina is in the $TiO_2$ pigment.

3. The method of claim 1, wherein the slurry comprises about 80 to about 88 wt. % $TiO_2$ solids.

4. The method of claim 1, wherein the reaction of titanium tetrachloride, aluminum chloride, and oxygen-containing gas occurs in the presence of a phosphorus chloride to provide 0.1 to 0.5 wt. % $P_2O_5$ in the $TiO_2$ pigment.

5. The method of claim 1, wherein the $TiO_2$ pigment is treated with a gas selected from the group consisting of steam, air, nitrogen, and mixtures thereof, at a sonic or supersonic velocity, a pressure of about 25–600 psi, and a temperature of 140°–650° C. subsequent to step (b) and prior to step (c).

6. The method of claim 5, wherein the treated $TiO_2$ pigment is subsequently separated from the gasses which were used to treat the pigment.

7. The method of claim 1, wherein the $TiO_2$ pigment is mixed with sufficient water in the presence of a dispersant selected from the group consisting of citric acid, polyacrylates, triethanolamine, 2-amino-2-methyl-1-propanol, monoisopropylamine, and mixtures thereof.

8. A method for making a photodurable, aqueous titanium dioxide pigment slurry, comprising the steps of:
   (a) reacting titanium tetrachloride, aluminum chloride and an oxygen-containing gas in the presence of a nucleant in the vapor phase to produce $TiO_2$ pigment, wherein sufficient aluminum chloride is added to provide at least 2 wt. % alumina in the $TiO_2$ pigment based on total weight of $TiO_2$ solids;
   (b) separating the $TiO_2$ pigment from the reaction gases;
   (c) mixing the $TiO_2$ pigment with sufficient water to produce a $TiO_2$ slurry comprising at least 78 wt. % $TiO_2$ solids, based on total slurry weight; and
   (d) diluting the slurry.

9. A method for making a photodurable, aqueous titanium dioxide pigment slurry, comprising the steps of:
   (a) reacting titanium tetrachloride, aluminum chloride and an oxygen-containing gas in the presence of a nucleant in the vapor phase to produce $TiO_2$ pigment, wherein sufficient aluminum chloride is added to provide at least 2 wt. % alumina in the $TiO_2$ pigment based on total weight of $TiO_2$ solids;
   (b) separating the $TiO_2$ pigment from the reaction gases;
   (c) mixing the $TiO_2$ pigment with sufficient water to produce a $TiO_2$ slurry comprising at least 78 wt. % $TiO_2$ solids, based on the total slurry weight;
   (d) diluting the slurry;
   (e) screening the slurry to remove grit; and
   (f) media-milling the slurry to reduce the size of the $TiO_2$ particles.

10. The method of claim 8 or 9, wherein about 3 to about 5 wt. % alumina is in the $TiO_2$ pigment.

11. The method of claim 8 or 9, wherein the slurry produced in step (c) comprises about 80 to about 88 wt. % $TiO_2$ solids.

12. The method of claim 8 or 9, wherein the slurry produced in step (d) is diluted to a $TiO_2$ solids content in the range of about 68 to about 78 wt. %.

* * * * *